United States Patent [19]
Gaffney et al.

[11] Patent Number: 5,333,702
[45] Date of Patent: Aug. 2, 1994

[54] THREE WHEEL SCOOTER WITH QUICK RELEASE REAR MOTOR AND WHEEL ASSEMBLY

[75] Inventors: Edward J. Gaffney, Pewaukee; Jhy-hong Lin, Milwaukee, both of Wis.

[73] Assignee: Ortho-Kinetics, Inc., Waukesha, Wis.

[21] Appl. No.: 110,617

[22] Filed: Aug. 20, 1993

Related U.S. Application Data

[63] Continuation of Ser. No. 559,301, Jul. 30, 1990, abandoned.

[51] Int. Cl.⁵ ...................... B62D 61/00; B62K 15/00
[52] U.S. Cl. .................................. 180/208; 180/907; 280/287; 403/363
[58] Field of Search ................. 180/208, 906, 907; 403/363, 364, 377, 382; 280/7.1, 287

[56] References Cited

U.S. PATENT DOCUMENTS

| Re. 32,242 | 9/1986 | Minnebraker | 180/11 |
| D. 178,841 | 9/1956 | Kummer | D15/15 |
| 3,117,648 | 1/1964 | Landreth | 180/55 |
| 3,177,962 | 4/1965 | Bailey | 280/242 |
| 4,037,678 | 7/1977 | Bruane | 180/11 |
| 4,503,925 | 3/1985 | Palmer et al. | 180/13 |
| 4,570,739 | 2/1986 | Kramer | 180/216 |
| 4,892,166 | 1/1990 | Gaffney | 180/208 |

*Primary Examiner*—Kenneth R. Rice
*Attorney, Agent, or Firm*—Ryan, Kees & Hohenfeldt

[57] ABSTRACT

Disclosed herein is a three wheel personal mobility vehicle in which a wheel and drive assembly is readily detached from a vehicle frame by spring loaded pull pins which are connected by a strap so both of the pins can be manipulated simultaneously with a single hand. The invention provides for quick release and reassembly of the drive assembly which is provided with a handle for carrying the same to a trunk of a car or the like.

9 Claims, 4 Drawing Sheets

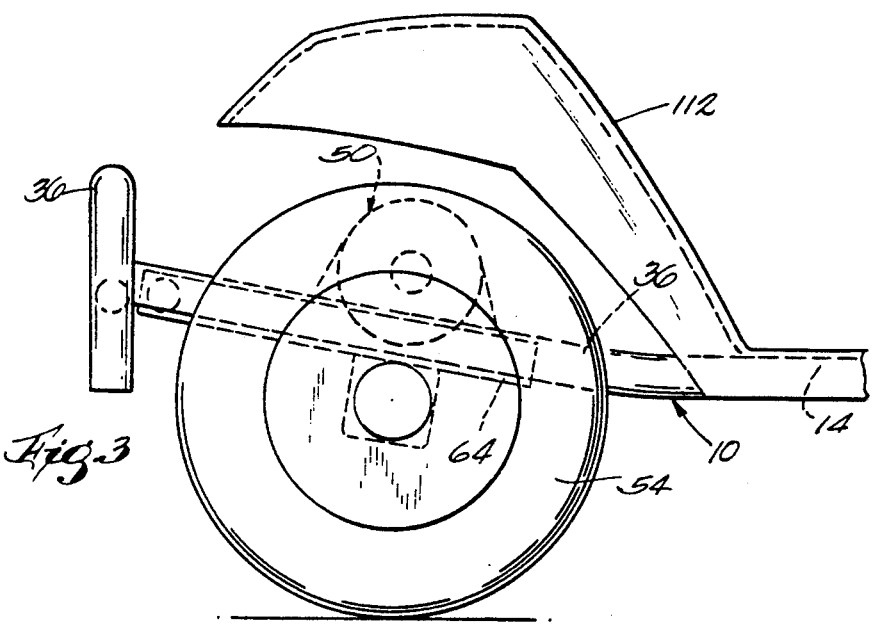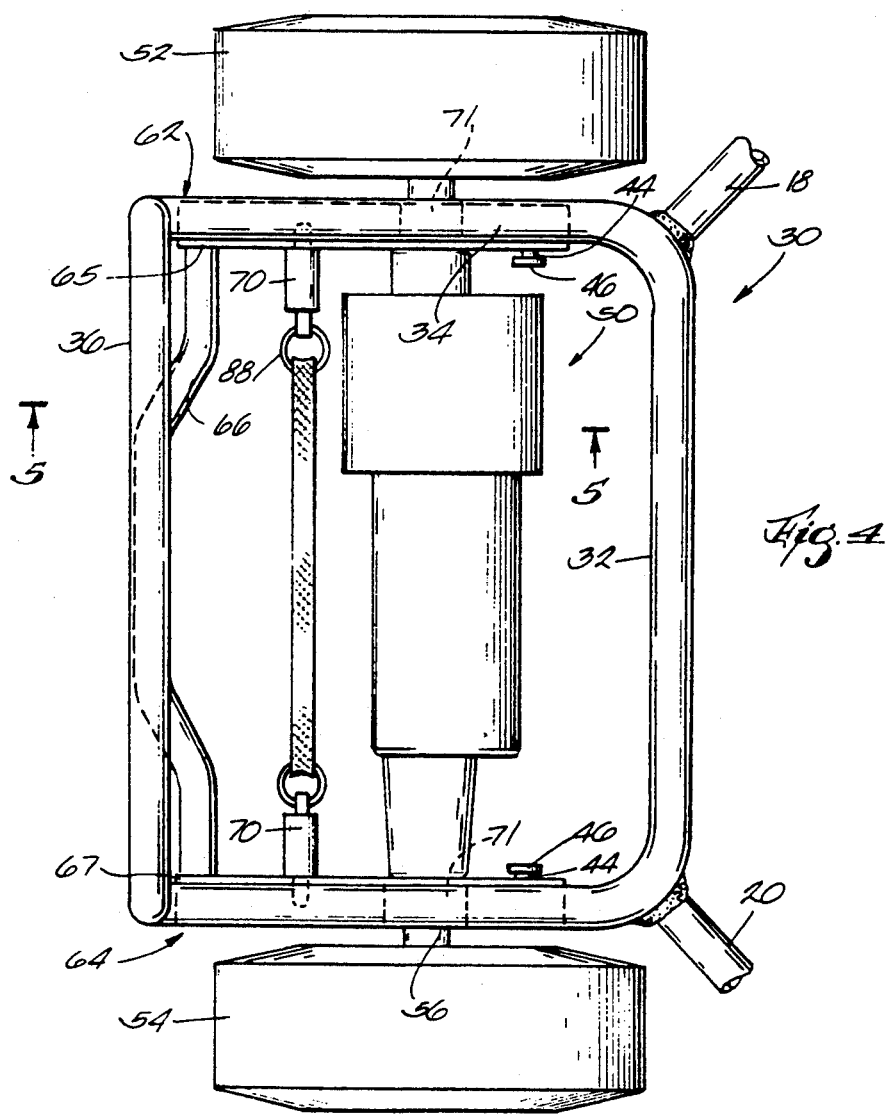

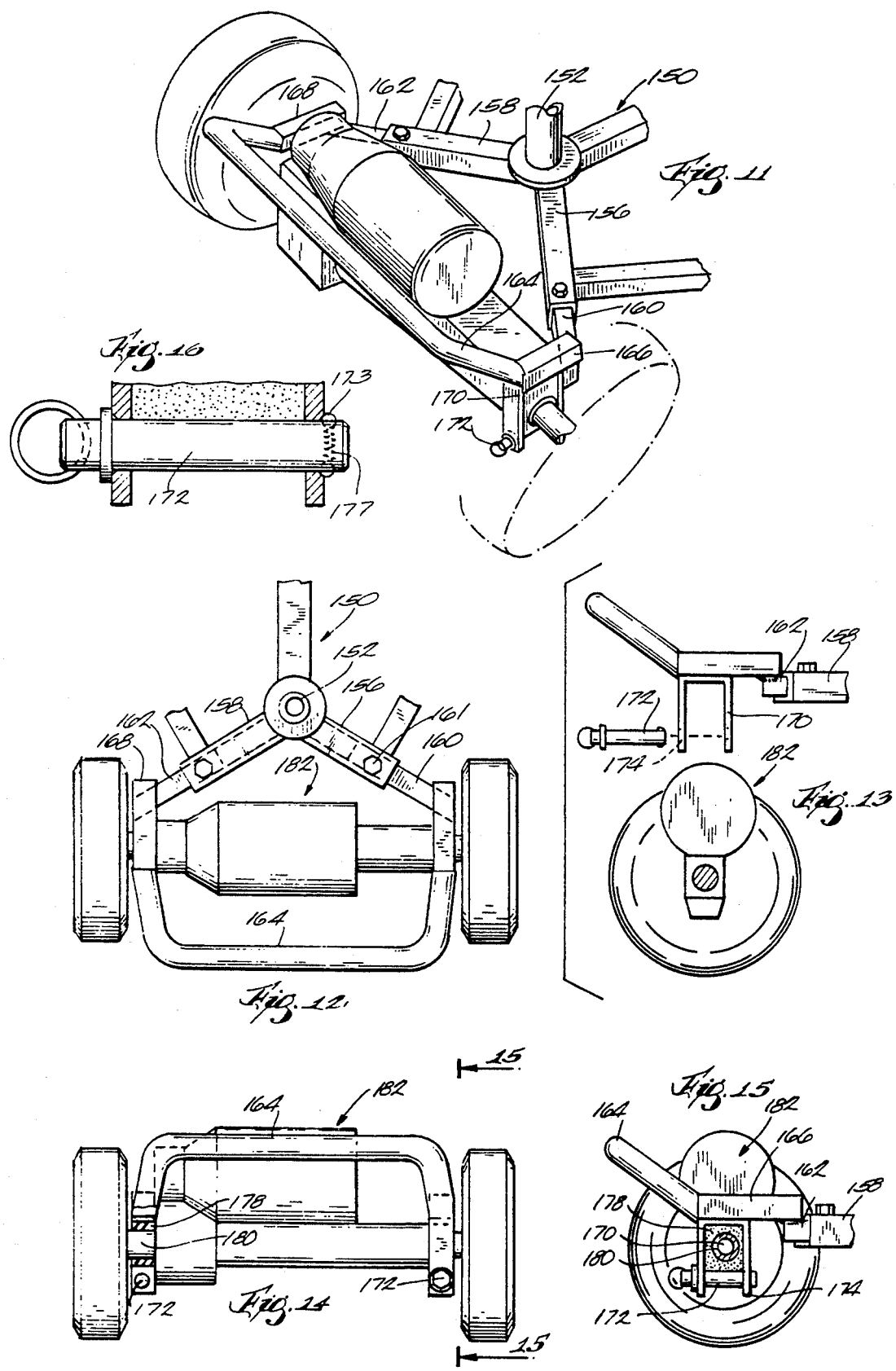

01
THREE WHEEL SCOOTER WITH QUICK RELEASE REAR MOTOR AND WHEEL ASSEMBLY

This is a continuation of copending application Ser. No. 07/559,301 filed on Jul. 30, 1990, now abandoned.

BACKGROUND OF THE INVENTION

The invention relates to personal mobility vehicles of the type manufactured by various companies including Burke, Orthokinetics and Everest and Jennings. The Burke U.S. Pat. No. 4,570,739 and Gaffney U.S. Pat. No. 4,892,166 are illustrative of a take apart unit in which the rear wheel and drive assembly can be separated from a front unit which contains a seat post and front wheel and steering assembly. Personal mobility vehicles of this type are intended to be disassembled with the various components being separated and placed individually into an automobile or van after separation for transport to another location to be reassembled for use. The present invention is an improvement of personal mobility vehicles with a separable drive unit.

SUMMARY OF THE INVENTION

The invention relates to personal mobility vehicles in which a one piece tubular frame formed from various tubular components welded together includes front and rear tubular bumpers with a rectangular frame portion at the rear of the frame which supports a drive assembly which is detachably connected to the frame for quick manual release. The drive assembly contains a motor-transmission with axles and wheels which can be called a transaxle which is supported by a bracket assembly. The bracket assembly includes two spaced angle iron bracket members interconnected by a handle. The angle iron members nest within the tubular rear frame members from below with the lower flanges of the angle iron embracing the bottoms of the frame tubes and the vertical flanges nesting between the opposed insides of the frame tubes. Thus, the drive assembly nests within the vehicle frame and the bracket flanges positively locate and position the assembly in horizontal and vertical planes. The angle iron brackets also have rectangular loops which receive and support the laterally projecting housing which surrounds the axles of the drive assembly.

The drive assembly can be detached without tools by gripping and pulling with one hand a cord or strap fastened to two quick release pins. This release mechanism frees the other hand for use in lifting and separating the drive assembly from the vehicle frame. A handle connected to the spaced brackets affords convenient carrying of the disconnected drive assembly. The brackets have slotted forward ends which are pushed over support pins on the inside of the frame tubes as the drive assembly is moved forwardly for connection to the frame. The pins and slots enable the wheel-drive assembly to move into place under the frame with the wheels on the ground. The quick release spring loaded pins carried by the brackets project laterally from the brackets and are received in apertures in the frame tubes to lock the drive assembly in place and also afford quick release from the locked position. Thus, a four point mount is provided for the drive assembly to the frame with attachment and detachment easily accomplished with one hand. The locking pins are supported on the angle iron brackets so no separate fasteners are required.

In a modified embodiment of the invention, the bumper is secured to the brackets and serves as the handle. Thus, the drive assembly is a portable unit provided with a handle. Further objects, advantages and features of the invention will become apparent from the disclosure.

DESCRIPTION OF THE DRAWINGS

FIG. 3 is a side elevational view of the frame section and drive assembly shown in FIG. 2.

FIG. 4 is a plan view of the drive assembly and frame shown in FIG. 3.

FIG. 11 is a fragmentary view of a further modified embodiment of a quick release drive assembly of the invention.

FIG. 12 is a plan view of the embodiment illustrated in FIG. 12.

FIG. 13 is a side view of the parts of the drive assembly shown in FIG. 12 with the drive assembly separated from the frame.

FIG. 14 is a rear view of the drive assembly shown in FIG. 12.

FIG. 15 is a sectional view along line 15—15 of FIG. 14.

FIG. 16 is an enlarged view of a quick release pin.

DESCRIPTION OF A PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
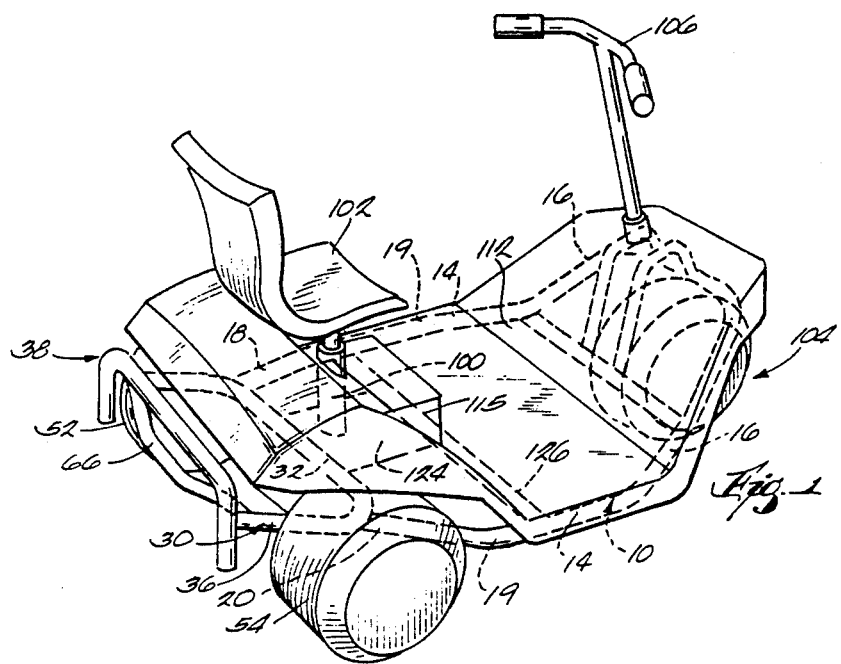
FIG. 1 is a perspective view of the personal mobility vehicle of the invention showing the plastic deck over the one piece frame.

In the drawings, FIG. 1 shows a frame 10 made of steel tubes which has opposed spaced side runs 14 which merge with front runs 16 and which have rear runs 19 with ends 18 and 20 (FIG. 2) which are welded or otherwise connected to a rear rectangular frame 30 which has a forward tube run 32 and side runs 34 and 36. A integrally connected bumper 38 is connected to the ends 40 and 42 of the frame 30. The frame 30 is provided with inwardly extending pins 44 with heads 46 spaced to provide clearance between the heads 46 and the adjacent face of the frame tubes to receive and support components of the drive assembly as hereinafter described. The frame runs 34 and 36 are also provided with apertures 48 and 50 which cooperate with locking pins 70 on the drive assembly as subsequently described.

Figure 2:
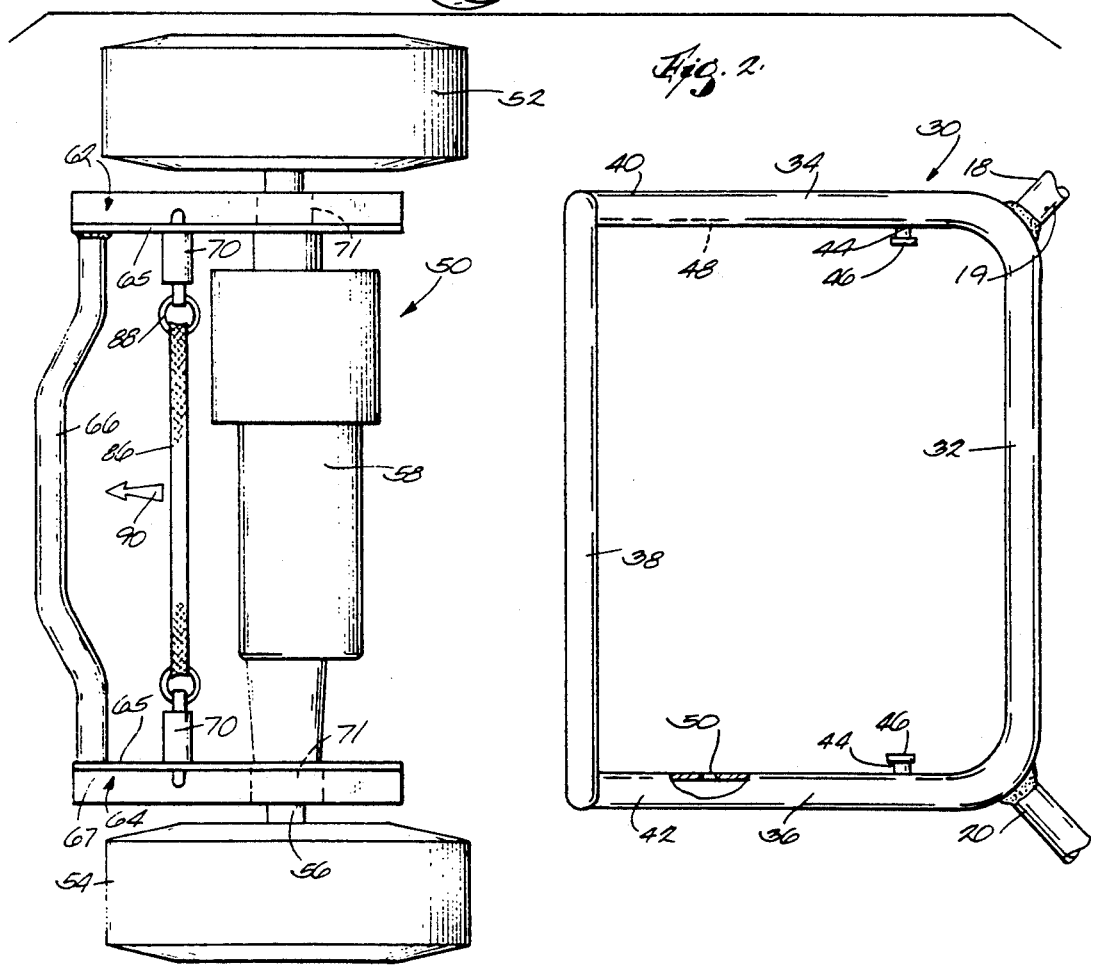
FIG. 2 is an enlarged view of the drive assembly shown in FIG. 1 and a fragmentary view of the frame of FIG. 1 shown separated from the drive assembly.

FIG. 2 shows a drive assembly 50 which includes a pair of spaced wheels 52 and 54 supported on axles 56 which extend from an electric motor gear drive unit 58. Various types of drive units can be employed including the drive unit made by ASI, Inc.

Figure 5:
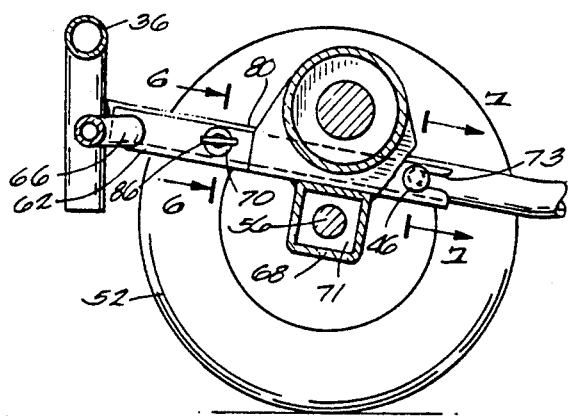
FIG. 5 is a sectional view along line 5—5 of FIG. 4.

Means are provided for supporting the drive unit on the frame 30. In the disclosed construction the means comprises a bracket assembly including two spaced angle iron frame parts 62 and 64 (FIG. 2) which, as shown in FIG. 5, include a rectangular frame 68 on the lower horizontal flange 67 of the angle irons 62, 64 which supports the axles 56 of the drive unit which is suspended therebetween. The rectangular frames 68 can be provided with bearings or be sized to receive the rectangular ends 71 (FIG. 5) of the drive unit housings. The angle iron members 62 and 64 are interconnected by a handle 66 (FIG. 2) which is welded at its ends to the upstanding or vertical flanges 65 of the angle iron members 62 and 64 as shown in FIG. 5.

Figure 6:
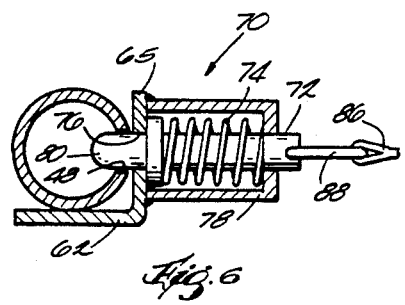
FIG. 6 is an enlarged view along line 6—6 of the locking pin shown in FIG. 5 and FIG. 10.

For the purpose of supporting the forward ends of the angle iron brackets, the forward ends of the flanges 65 have notches 73 (FIG. 5) which interfit with the support pins 44 when the drive unit is assembled within the frame 30 and thus form part of the means for fastening the drive assembly to the frame. The means for fastening the wheel drive assembly to the main frame also includes a pair of locking pins 70 which, as shown in FIG. 6, include a plunger 72 which is biased to an extended position by spring 74 through an opening 76 in a housing 78. The ends 80 of the plungers project through the apertures 48 and 50 in the frame 30 to positively position the flanges 65 on the support pins 44 and which in turn provide support for the drive assembly on the frame 30. When assembling the drive assembly to the frame the bumper 36 is manually lifted and the drive unit is moved forwardly under the bumper to engage the notches 73 with the support pins 44. Once the notches are in place on the support pins 44, the locking pins 70 are withdrawn from their extended position by a strap 86 connected to the loops 88 on the ends of the plungers 72. Manual pulling of the middle of the strap 86 in the direction of arrow 90 (FIG. 2) will cause the pins to be withdrawn so that the drive assembly can be pivoted about the support pins 44 and the ends 80 of the plungers 72 will ride along the surface of the frame tubes 34 and 36 until the ends 80 locate and register in the apertures 48 and 50. Thus, the drive assembly is connected at four points to the frame with two connections made first with the sliding engagement over the pins. The lower flanges of angle members 62 and 64 engage the under surface of the frame 34 and 36 to stop or limit upward pivotal movement of the frame to an appropriate position for registry of the plunger ends 80 in the apertures 48 and 50. The handle 66 can be used for carrying the drive unit when separated from the frame. The bracket assembly thus nests within the frame runs 34 and 36 with the vertical flanges 65 between the runs 34 and 36 and the horizontal flanges beneath the tubes 34, 36. The drive assembly is thus securely positioned and confined between a rigid rectangular frame yet can be quickly disassembled. The connection of the support pins positively fixes the fore and aft position of the drive assembly within the frame. This facilitates registry of locking pins 70 in apertures 48, 50 as the pins are swung in an arc along the inside faces of the tubes 34 and 36 to hunt for the apertures 48, 50 which are located on the swung arc of the pins 70. This arrangement greatly facilitates assembly of the drive unit.

Other components of the unit shown in FIG. 1 includes a seat post 100 with a standard seat 102, a front wheel assembly 104 and a steering tiller 106. The plastic shroud or deck 112 covers the entire front and rear of the frame 12 and also provides a support for a battery 115. Controls can be suitably provided on the steering tiller. The seat assembly and tiller assembly can be disclosed as in U.S. Pat. No. 4,892,166, the entire disclosure of which is incorporated herein by reference. The steering column tube can be supported by a plate 124 which is welded between a cross frame member 126 and the end 32 of the U-tube.

Figure 8:
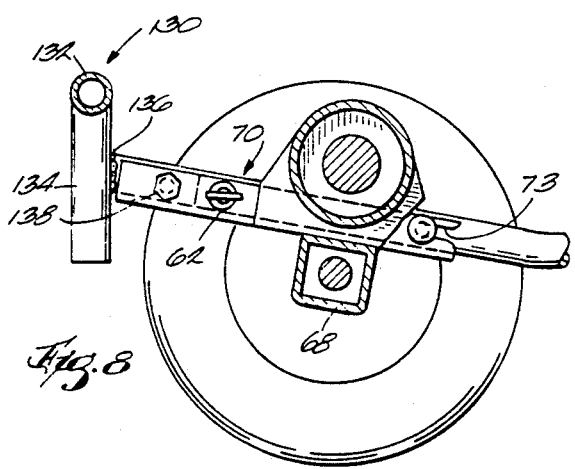
FIG. 8 is a sectional view similar to FIG. 5 of a modified embodiment of the invention.
Figure 7:
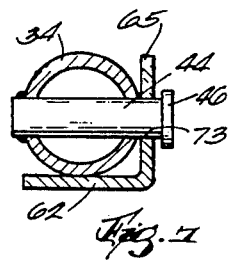
FIG. 7 is an enlarged view along line 7—7 of FIG. 5.
Figure 10:
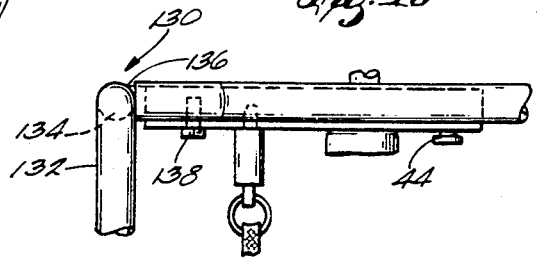
FIG. 10 is a fragmentary plan view of the parts illustrated in FIG. 9 for the modified embodiment.
Figure 9:
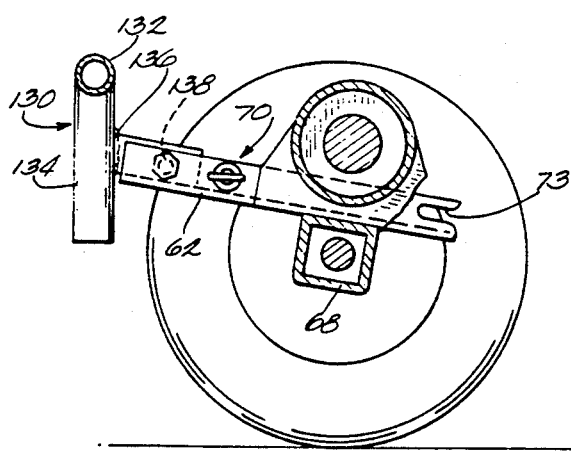
FIG. 9 is a view of the modified embodiment of FIG. 8 with the brackets for the drive assembly separated from the frame.

FIGS. 8, 9 and 10 show a modified embodiment of the invention in which the bracket assembly 130 includes a horizontal bumper member 132 and two depending legs 134 which form a U-shaped frame. The legs 134 are connected to forwardly extending short tube portions 136 which are bolted or welded to the angle irons brackets 62, 64 by bolts 138. Thus, the bumper 132 is removed with the bracket assembly 130 when separating the drive unit from the frame. In this case the bumper is the horizontal tie between the angle irons 62, 64 and a separate handle such as the handle 66 is not employed. The angle irons and the support pins and locking pins are the same as in the prior embodiment in FIGS. 1-7 with the same rectangular loops 68 to support the drive assembly.

FIGS. 11-16 show a further modified embodiment of the invention in which a frame 150 includes a central frame member which extends fore and aft and is connected to a front wheel assembly (not shown) and a steering tiller. A seat post 152 is provided. The frame also includes angularly and rearwardly extending frame members 156, 158 which have telescopically related extensions 160 and 162. The extensions 160, 162 can be bolted by bolts 161 or welded to frame members 156, 158. The extensions are welded or otherwise secured to the legs 166 and 168 of a U-shaped bumper 164. Inverted U-shaped brackets 170 are welded to the legs 166 and 168. Quick release pins 172 with bearing 173 urged by springs 177 (FIG. 16) are receivable in apertures 174 in the U-shaped brackets to capture the axles or frame of the drive unit. Rubber grommets, mounts or bearings 178 are provided which receive the axles 180 of a motor, drive, transmission axle and wheel assembly 182. This unit can be a conventional unit available from ASI, Inc. To release the motor drive unit from the frame the pins 172 are merely pulled and the drive assembly will drop from the U-shaped brackets. Alternatively, the frame can be lifted by grasping the bumper 164 and lifting the frame over the motor drive unit as the pins are released.

We claim:

1. A personal mobility vehicle comprising
a frame having spaced, generally parallel rear frame members,
a drive assembly positioned beneath the rear frame members, and
means for detachably connecting the drive assembly beneath the rear frame members, the means including
spaced, parallel vertically oriented brackets secured to either the drive assembly or the rear frame members,
a flat surface on the top of the drive assembly on which a portion of the rear frame members can be supported, and quick release means comprising spring loaded retractable pin means that extend through aligned apertures passing through the brackets and into the rear frame members for releasably fastening the drive assembly to the frame to afford easy installation and removal of the drive assembly.

2. The vehicle of claim 1 and further including a strap interconnecting the spring loaded pin means, the springs urging the pins into a locking position within the apertures, the strap being movable by the user to withdraw the pin means from the apertures to release the drive assembly from beneath the rear frame members.

3. The vehicle of claim 1
where the brackets are attached to the drive assembly, and
wherein the quick release means further includes inwardly extending pins on the rear frame members and notches on the brackets adapted to interfit and be supported on the inwardly extending pins as the spring loaded pin means are brought into alignment with the apertures.

4. The vehicle of claim 3 wherein the brackets are interconnected by a handle for carrying the drive assembly.

5. The vehicle of claim 1 in which the brackets include a bumper at the ends of the brackets which interconnects the brackets.

6. The vehicle of claim 1 wherein the brackets comprise angle irons with vertical and horizontal flanges with the vertical flanges located inside the rear frame members and the horizontal flanges located beneath the rear frame members.

7. A personal mobility vehicle comprising a frame having spaced fore and aft extending frame portions, a drive assembly, brackets for supporting the drive assembly on the frame, the drive assembly including wheels, axles, electric motor and gears, the brackets being shaped to receive and support laterally extending wheel axles and for downward release of the drive assembly, and spring loaded pin means on the brackets for detachably connecting the drive assembly to the fore and aft frame portions.

8. The vehicle of claim 7 wherein the brackets are U-shaped with parts of the drive assembly extending therethrough and the pin means closes the U-shaped brackets to retain the parts in the brackets.

9. A personal mobility vehicle comprising
a frame having spaced generally parallel fore and aft extending rear frame members,
a drive assembly, and
means for detachably connecting the drive assembly to the rear frame members including
spaced, parallel interconnecting spaced brackets which fit between the frame members and which support the drive assembly, and
quick release means for fastening the brackets to the frame members to afford easy installation and removal of the drive assembly, the quick release means providing a four point connection and comprising inwardly extending opposed headed pins on the rear frame, slots on the brackets which interfit on the pins to provide two frame/drive assembly connections, and opposed apertures on the rear frame members located in the arc of travel of a pair of spring loaded pins which are biased outwardly so that swinging the brackets and drive assembly about the headed pins will pivot the spring loaded pins into registry within the apertures.

* * * * *